Oct. 19, 1937.　　　A. W. MORTON ET AL　　　2,096,003
PISTON RING
Filed Nov. 14, 1934
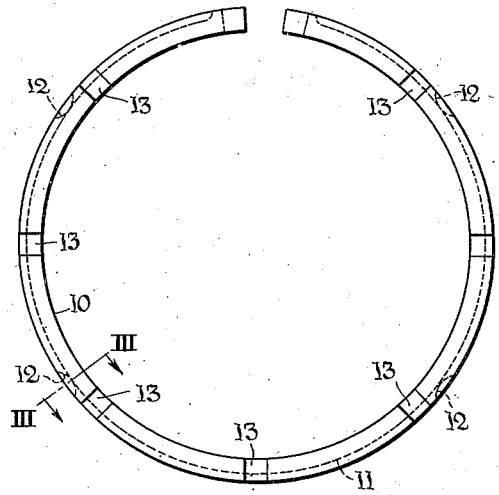
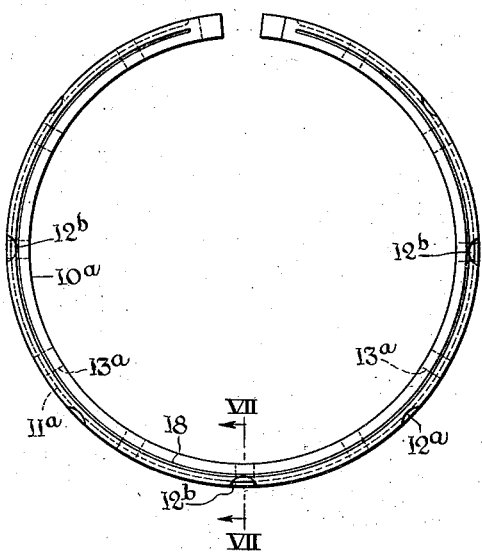
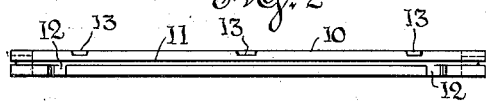
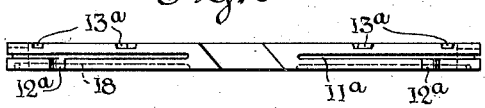
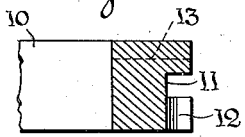
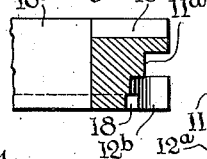
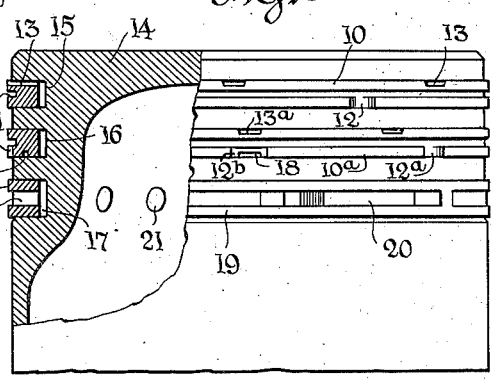
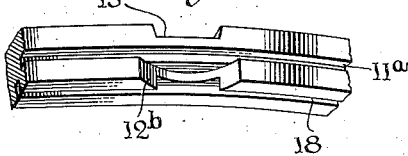
Inventors
Allen W. Morton
and Emil A. Koether
By Dodge and Sons,
Attorneys Patented Oct. 19, 1937

2,096,003

UNITED STATES PATENT OFFICE 2,096,003

PISTON RING

Allen W. Morton and Emil A. Koether, Baltimore, Md., assignors, by mesne assignments, to Koppers Company, a corporation of Delaware Application November 14, 1934, Serial No. 753,026

3 Claims. (Cl. 309—44)

This invention pertains to piston rings, the construction and advantages of which will be hereinafter set forth, reference being had to the annexed drawing, wherein:—

Figure 1 is a plan view of a ring embodying one form of the underlying inventon;

Fig. 2, an elevation thereof as seen from the cylinder-contacting face;

Fig. 3, a cross sectional view on the line III—III of Fig. 1, and shown on an enlarged scale;

Fig. 4, a perspective view of a portion of the ring as depicted in the above figures;

Fig. 5, a view of the modified structure embodying the principles of the inventon, the ring being seen from its under face;

Fig. 6, an edge view thereof;

Fig. 7, a transverse sectional view, taken on the line VII—VII of Fig. 5;

Fig. 8, a perspective view of a portion of the ring as shown in Figs. 5 to 7, inclusive, the cylinder-contacting and under face of the ring being disclosed; and Fig. 9, a sectional elevation showing the rings of our invention in position within the ring grooves of a piston, together with an oil ring located in the lowermost groove.

As is well known, practically all engines in use operate with cylinders having an internal diameter larger at the top than at the bottom, due primarily to the heat at the top of the cylinder nearest the combustion chamber, which causes expansion of the cylinder throughout this section, and, secondly, on account of wear which results from blow-by at this point.

Therefore, when the piston travels upwardly from the smaller part of the cylinder toward the top, where the cylinder is larger, the ring must necessarily move outward to maintain its contact with the cylinder wall. If, now, the pressure on the top of the ring is so great as to cause excessive side friction between the ring and the bottom land of the piston groove, against which it is forced, the ring will tend to stick in the groove, or move outwardly so sluggishly as to allow blow-by between the ring and the cylinder before the ring actually seals the cylinder at the end of the compression stroke. One of the objects of this invention is to overcome this sluggish outward movement of the piston ring and maintain an effective seal between the ring and the cylinder.

Another object of the invention is to provide a piston ring in which means is provided for insuring the passage of the fluid pressure to the inner portion of the ring or between the inner surface of the ring and the bottom of the groove, in order that a ring making a relatively close fit between the lands of the groove may be employed. In many instances, rings are given such clearance between the lands of the ring groove that they may move out freely due to fluid pressure getting behind the ring but this excessive side clearance allows the ring to slap against the sides of the groove and this, of course, leads to noise in the operation of the engine, producing what is commonly known as "side slap" or "ring click". The present construction employs a ring that accurately fits the grooves in the piston and makes use of fluid pressure to assist in maintaining the ring at all times in contact with the cylinder, and, at the same time, by means of oil distributing grooves, provides sufficient lubrication between the ring and the land of the ring groove to minimize friction therebetween.

The present tendency in the operation of Diesel engines and gas engines is toward higher speed, and one of the greatest difficulties to be overcome by reason of this increased speed is blow-by and wear of the piston rings. It naturally follows that wear of the piston rings also results in the wear of cylinders and pistons.

Wear occurs, as a rule, due to blow-by, which blows the film of oil from between the ring and the cylinder and allows metal-to-metal contact before sufficient oil is again supplied to lubricate the upper portion of the cylinder. Of course, the hot gases of combustion also burn the oil, not only from between the ring and the cylinder, but also from between the ring and the lands of the grooves.

A further object of the invention is to provide a structure whereby blow-by is minimized and oil consumption maintained at the lowest possible point consistent with efficient and economical operation of the motor. In other words, the structure as hereinafter set forth and claimed maintains an oil film between the piston ring and the cylinder wall at all times, and it follows, therefore, that when this is done, a large percentage of wear between the parts is thus eliminated.

The means whereby these desirable objects may be accomplished takes the form of a reservoir on the periphery of the ring produced by a groove and one or more bleeder ports or ducts extending downwardly therefrom to the under face of the ring, the volumetric capacity of the reservoir and of the bleeder ports or ducts being so proportioned as to bring about the desired result. From actual tests carried out under identical conditions in all respects, it has been determined that the total port area approximating from 5 to 15% of the reservoir area establishes the best operating conditions.

By the provision of the reservoir and the maintenance of the optimum quantity of oil therein, and in a modified form providing an oil-receiving channel or groove in the lower face of the ring as well, an oil film is always maintained between the ring and the cylinder, and where the modified form is utilized, an oil film is likewise maintained between the ring and the lower land of the piston groove as well, with a consequent diminution in wear between the various elements.

Referring first to Figs. 1 to 4, inclusive, 10 denotes the body of the ring, the ends whereof are formed to produce a proper angle joint when the ring is closed; it being understood, however, that any form of joint may be employed. The ring, which will preferably be formed of cast-iron to which suitable tension is imparted in any desired manner, is provided with a circumferential groove 11, which is relatively narrow with reference to the vertical measurement of the cylinder-contacting face of the ring, and which groove terminates short of the ends of the ring body adjacent the joint.

Extending downwardly from said groove and opening through the lower face of the ring is a series of vertically disposed ducts or channels 12, preferably equidistantly spaced about the ring, as indicated in Fig. 1.

Formed in the upper face of the ring body is a plurality or series of passages 13, said passages being radially disposed and preferably equidistantly spaced from each other. They pass from the outer to the inner face of the ring and form, as will be readily seen upon reference to Fig. 9, looking at the uppermost ring in said figure, open passageways for the compressed and/or expanding gases to pass inwardly to the rear of the ring, or, in other words, into the space existing between the innermost portion of the ring-receiving groove and the inner face of the ring.

The piston in Fig. 9 is denoted by 14, and the uppermost ring-receiving groove by 15. The other grooves are denoted by 16 and 17, respectively.

As above indicated, gas under pressure will enter the passages 13 and into the groove 15 to the rear of the ring, forcing the same outwardly into close contact with the cylinder wall. This is particularly advantageous where the interior diameter of the cylinder is enlarged at its upper end, for the greatest blow-by usually occurs while the piston is in this portion of the cylinder.

The presence of the relatively narrow groove 11 which, by reason of its narrowness, does not materially reduce the wide bearing surface to the cylinder-contacting face of the ring, together with the upwardly extending ducts or channels 12 extending from the lower face of the ring into the groove 11, assure the presence of an oil film at all times between the ring and the cylinder surface.

By reason of the fact that the uppermost ring, due to ready access of gas behind the ring, is moved outwardly and held close to the cylinder wall at all times, notwithstanding that in and of itself it may not have sufficient tension to effect this condition, blow-by is materially lessened. In connection with this action, the presence of an oil film brought about by the oil reservoir formed upon the outer face of the ring, together with the means for supplying oil thereto, ensures very high efficiency of the ring in preventing blow-by. As a consequence, the lower rings in the ring belt do not become gummed up, nor does the oil become burned thereon, as is the case with many present day installations.

In Figs. 5 to 8, inclusive, a slightly modified form of the ring is shown. In this instance, the under face of the ring 10$^a$ is provided with a groove 18 (see Figs. 5, 8 and 9), wherein, in the latter figure, the ring is shown in the centrally disposed ring-receiving groove 16.

As will be noted upon reference to Fig. 9, the groove or channel opens downwardly toward the lower land of the ring-receiving groove 16, so as to afford proper lubrication between said land and the ring. As with the other form, cross passages or openings in the upper side face of the ring are provided and are denoted by 13$^a$. They permit free access of the fluid pressure to the rear of the ring, which tends to expand the ring. The annular groove or channel formed in the cylinder-contacting face of the ring is denoted in this instance by 11$^a$, and channels or ducts which extend upwardly from the bottom face of the ring, as in the first described construction, are numbered 12$^a$.

While not ordinarily desirable, still for special occasions, as where an engine user is troubled with unusually great groove wear, the ring may be provided with other ducts or channels, as 12$^b$, similar to 12$^a$ but of a greater depth, said channels or cut-outs 12$^b$ serving to connect the peripheral ring groove 11$^a$ and the under face groove 18 (see Figs. 8 and 9).

Such formation of the ring will allow oil which is scraped into channel 11$^a$ to flow down through passages or ducts 12$^b$ to the under face channel or groove 18, thus supplying a greater amount of oil to groove 18 and to the lower land of the piston groove. This extra lubrication not only cuts down wear but overcomes a certain sluggishness of action of the ring due to pressure on top of the ring resulting in side friction between the ring and the groove.

It is manifest that any means may be employed to impart tension to the ring, and if so desired an inner expander ring may be employed in connection with any of them, and more particularly with the ring denoted by 19 mounted in the ring channel 17, said ring 19 being of the ventilated type with slots or passages 20 through the ring and functioning with openings as 21 extending through the piston wall and into the interior thereof.

It is to be noted that the rings are symmetric in cross section, and have no tendency to twist sideways, but fill the piston grooves uniformly with a flat bearing on the lower face, as well as the upper side face.

Movement of the piston downwardly causes the oil to be scraped from the cylinder wall, and passing through the ducts or channels 12, enters the circumferential groove or reservoir 11. Oil is thus held to be distributed upon an upward movement of the piston, insuring proper lubrication between the ring and the cylinder.

After numerous tests and experiments with the ring as above described, and more particularly the ring having the circumferential groove or reservoir with the channels or ducts 12 (12$^a$) extending downwardly therefrom to the lower face of the ring, we have ascertained and definitely determined that when the ratio of the volume of the channels or ducts with reference to that of the reservoir or groove is about 10%, the best results obtain. We have found, however, that there may be an approximate variation in range from 5% minimum to 15% maximum. In this connection, a different number of channels or ducts were employed in the various tests, some rings with three and others with four, and it was found that where a larger or greater number were present, the results were not so efficient or satisfactory.

Where the lower or under face groove or channel 18 is present, the oil will, of course, pass inwardly thereto on the downward suction stroke of the piston, as the tendency then will be to force the ring upwardly and free the lower face from contact with the lower land of the ring groove. By reason of the deep cut-outs or ducts 12$^b$ the oil will pass directly into the lower face channel 18, irrespective of whether or not the ring was lifted with reference to the lower land of the groove in which it is mounted. In this way, proper lubrication is obtained between the lower face of the ring and the adjacent land face.

As a piston carrying a ring of this invention moves downwardly or outwardly in its cylinder under explosive action, oil is scraped from the cylinder wall and forced upwardly through the ducts 12 (or 12$^a$) into the oil receiving and distributing groove or reservoir 11 (or 11$^a$) formed in the cylinder-contacting face of the ring. This scraping action increases as the piston speed increases, thus building up the oil in the pressure groove. Such action is in direct proportion to the increase or decrease of piston speed and, therefore, provides an effective pressure seal against compression losses at all engine speeds.

What is claimed is:

1. In combination with a piston having at least one ring-receiving groove, a piston ring mounted therein, said ring having a groove formed exteriorly thereof, said groove being relatively narrow as compared to the cylinder-contacting face in which the groove is formed, said ring also having in its lower face a channel designed to receive oil, said channel opening directly above the lower land of the ring-receiving groove; and a plurality of vertically disposed ducts formed exteriorly in the lower portion of the cylinder-contacting face of the ring, said vertical ducts in part at least opening at their upper ends into the groove formed in the cylinder-contacting face of the ring, and at least one such duct connecting the groove and channel.

2. In combination with a piston having at least one ring-receiving groove, a split piston ring mounted therein, said ring having a circumferentially extending groove formed in the cylinder-contacting face thereof, said groove being relatively narrow and stopping short of the ring joint, said ring also having a channel formed in its lower face extending circumferentially thereof, said channel opening directly above the lower land of the ring-receiving groove, a series of relatively shallow ducts formed in the lower portion of the cylinder-contacting face of the ring and opening at their upper ends into the groove, a series of deeper ducts also formed in the lower portion of the cylinder-contacting face of the ring, said deeper ducts interconnecting the channel and groove, and a series of channels formed in and extending transversely of the upper face of the ring.

3. In combination with a piston having at least one ring-receiving groove, a split piston ring mounted therein, said ring having a groove formed exteriorly thereof, said groove being relatively narrow as compared to the cylinder-contacting face in which the groove is formed and stopping short of the ring joint, said ring also having in its lower face a channel designed to receive oil, said channel opening directly above the lower land of the ring-receiving groove, and a plurality of axially disposed ducts formed in the lower portion of the cylinder-contacting face of the ring, said ducts opening at their upper ends into the groove formed in the cylinder-contacting face of the ring, said ducts having a volumetric area approximately 10% of that of the groove, and at least one such duct connecting the groove and channel.

ALLEN W. MORTON.
EMIL A. KOETHER.